Nov. 2, 1954

A. H. KETTLER 2,693,527

SWITCHING CIRCUIT

Filed June 27, 1952

INVENTOR.
ALFRED H. KETTLER
BY George Sipkin
Lee J. Huntzberger
ATTORNEYS

United States Patent Office 2,693,527

Patented Nov. 2, 1954

2,693,527

SWITCHING CIRCUIT

Alfred H. Kettler, Collingswood, N. J., assignor, by mesne assignments, to the United States of America as represented by the Secretary of the Navy Application June 27, 1952, Serial No. 295,867

5 Claims. (Cl. 250—13)

This invention relates to electric switching and more particularly to associated switching circuits operated under the control of a manual switch on an electrical apparatus.

An object of this invention is to provide an improved switching circuit.

A further object is to provide an electronic switching circuit operable under the control of a manual switch.

A further object is to provide an electronic switching circuit operable by an electric pulse generated in response to actuation of a manual switch.

A further object is to provide a pulse by means of which switching of associated circuits can be accomplished without modification of sound powered headsets.

A further object is to provide a pulse-operated switching means which does not require sensitive relays for use with headsets.

Other objects and many of the attendant advantages of this invention will be readily appreciated as the same becomes better understood by reference to the following detailed description when considered in connection with the accompanying drawings wherein.

Figure 1:
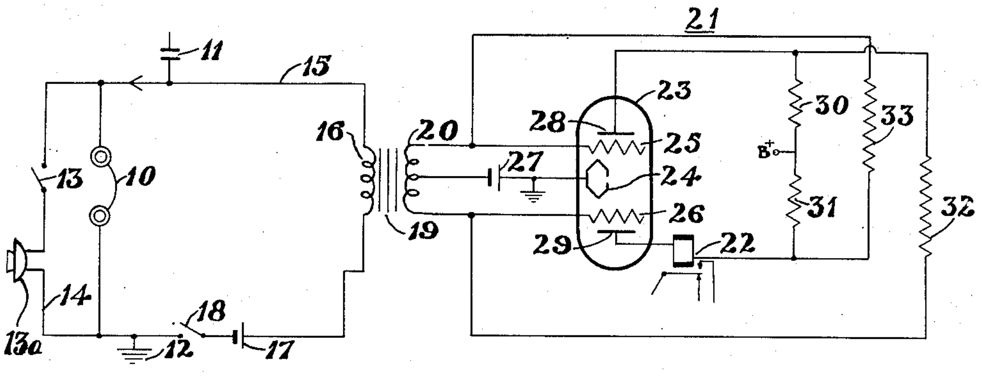
Fig. 1 is a schematic diagram of a preferred embodiment of this invention.

In Fig. 1 the headset 10 is coupled to the output stage of a receiver (not shown) through coupling condenser 11. The other side of the headset is grounded as at 12. The receiver output flows through the headset 10 and returns through ground as at 12. Headset 10 is bypassed by a switch 13 which is in series with a microphone 13*a* in parallel branch circuit 14. When the switch 13 is closed, the branch 14 being a low resistance path bypasses substantially all the current originally flowing through the headset 10. The switch 13 is closed when the operator is transmitting and is open when the operator is receiving.

In order to control auxiliary equipment by the opening and closing of switch 13 a branch 15 is provided in parallel with headset 10. The branch 15 comprises a transformer primary coil 16, a DC source 17 and a manual switch 18. When the switch 18 is closed a loop circuit including source 17 is completed. The last mentioned circuit comprises the primary coil 16 of transformer 19, lead 15, headset 10 (or headset 10 and its bypass branch 14), and closed switch 18. All DC current from source 17 flows through the closed loop circuit comprising the aforementioned elements.

The resistance of the different model headsets currently available differs considerably. The headset of one manufacturer may have a resistance five times that of another manufacturer. However, headset resistance is never below 28 ohms for the listening condition. When the talk switch 13 on the headset is closed the resistance drops to a value between 11 and 3 ohms but never higher than 11 ohms. Therefore the headset resistance varies from a maximum lower value of 11 ohms to a minimum upper value of 28 ohms. The DC current that flows through transformer primary 16 goes through a change in accordance with the change in resistance when the switch 13 is operated. The change in current through primary coil 16 may be considerable if the difference between the switch open resistance and the switch closed resistance is much greater than the minimum range 11–28 ohms.

Primary coil 16 is part of a non-linear transformer 19 having a secondary coil 20. The core of transformer 19 has a relatively low saturation point as illustrated by the graph in Fig. 2. The current through primary 16 varies from a value of $i_1$ or less to a value of $i_2$ or more in the manner explained above. The core 19 is designed to have a substantially linear flux characteristic in the current range $i_1$—$i_2$. Beyond $i_2$ the flux-current characteristic levels off abruptly as the transformer core becomes saturated. Since the voltage induced in the secondary of a transformer is a function of the time rate of change of flux linking the secondary coil, a voltage is induced in the transformer secondary 20 as the current increases toward $i_2$ or decreases from $i_2$. For current variations between $i_2$ and above, no voltage is induced in the secondary coil 19. Notwithstanding the difference in resistance of different headset models used in the circuit described herein, when switch 13 is actuated the transformer 19 will provide a similar output pulse the magnitude of which is limited by the saturation effect of the transformer core.

The secondary 20 of transformer 19 controls a conventional flip-flop circuit 21. A conventional relay 22 is controlled by said flip-flop circuit. The flip-flop circuit 21 comprises a twin triode 23 having cathodes 24 which are grounded. The transformer secondary 20 is connected to the respective grids 25 and 26. A cell 27 for grid bias is connected between ground and the centertap of the transformer secondary. The plates 28 and 29 are joined by a pair of resistors 30 and 31. A plate supply is connected to the junction of plate resistors 30 and 31. Plate 28 is connected to grid 26 through a high resistance 32. Likewise, plate 29 is connected to grid 25 through a high resistance 33. The relay 22 is in circuit with plate 29 so that when current flows from plate 29 to cathode 24 relay 22 is energized.

A flip-flop circuit such as shown at 24 has two stable conditions of operation. One operating condition includes conduction from plate 28 to cathode 24 with no conduction from plate 29 to cathode 24, the other operating condition includes conduction from plate 29 to cathode 24 with no conduction from plate 28 to cathode 24. The plate resistors 30 and 31, the corresponding circuit leads, the corresponding tube elements, etc., are as identical as may be conveniently obtained commercially. When the flip-flop circuit plate supply is turned on, each of the plates 28 and 29 begin to pass current to cathode 24. Plate 28 conducts more heavily than plate 29 because there is more impedance in series with plate 29 than with plate 28 namely the coil of relay 22. As heavier current passes through resistor 30, the voltage at grid 26 decreases. As the voltage of grid 26 decreases current through plate 29 decreases. Due to the decreased current through plate 29 and resistor 31, the voltage at grid 25 increases. Increased voltage on grid 25 further increases the voltage drop across resistor 30 which in turn decreases the voltage on grid 26. Current through plate 29 decreases. The action continues until plate 29 ceases to conduct due to the bias of its grid dropping below cutoff and plate 28 conducts continuously.

A positive voltage of sufficient magnitude momentarily applied to the grid 26 reverses the action outlined above so that the plate 29 conducts continuously and plate 28 ceases to conduct. When the plate 29 conducts, relay 22 is energized for controlling auxiliary equipment. Plate 28 conducts again when a positive voltage of sufficient magnitude is applied to grid 25.

Figures 2, 3:
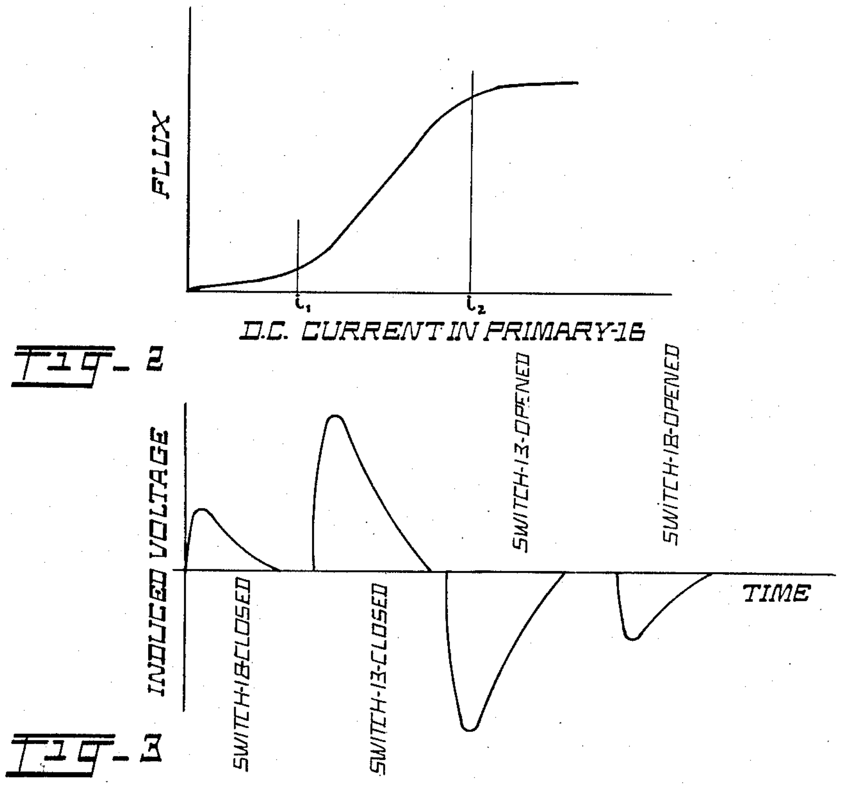
Fig. 2 illustrates by a graph the relationship in the non-linear transformer between the DC current flow and the flux produced thereby.
Fig. 3 illustrates by a graph the output voltage pulses of the non-linear transformer resulting from the switching operation.

The grid voltages for causing the circuit 21 to flip-flop are supplied under the control of switch 13. When switch 13 is closed current flow momentarily increases from a value of $i_1$ or less to a value of $i_2$ or more as shown in Fig. 2. The change in current flow through primary coil 16 results in an induced voltage in secondary 20 during the period of changing flux. The direction of the induced voltage corresponds to the direction of current change. Fig. 3 illustrates the relationship between the voltage induced in secondary 20 and time for the various switching actions. The induced voltage is essentially a pulse the magnitude of which is limited by the saturation of the transformer core.

In operation first the switch 18 is closed. A D. C. current begins to flow through the loop circuit comprising primary 16 and headset 10. A small voltage pulse is induced in secondary 20. Since the plate voltage is disconnected there is no resultant effect on the circuit 21. The plate voltage of the flip-flop circuit 21 is then supplied to the plates. Because of the difference in the resistance of the respective circuits of plates 28 and 29, the circuit 21 will achieve stable operation with the plate 28 conducting and the plate 29 non-conducting. So long as the operator leaves the switch 13 in open or listening position no further change is effected. It is to be noted that the A. C. output of the receiver that is coupled to the headset 10 through condenser 11 does not flow through the transformer coil 16 to ground because the coil 16 acts as a choke of high impedance to said receiver output. Therefore, all of the receiver output flows through the headset 10 to ground. When the operator wishes to change from listening to sending condition he closes the switch 13. When the switch 13 is closed most of the receiver output is shunted through the bypass branch 14. Furthermore, since the impedance to D. C. current flow from source 17 is decreased, the latter supplies more current which flows through the primary 16. As the current through the primary 16 increases from a value of $i_1$ or less to $i_2$ or more, a voltage pulse shown in Fig. 3 is induced in secondary 20. The pulse drives the potential of grid 25 below cutoff while it momentarily raises grid 26 above cutoff. Plate 28 ceases to pass current and plate 29 begins to pass current. The flip-flop circuit 21 remains stable in that condition. Relay 22 remains energized for so long as plate 29 conducts, said relay 22 controlling the operation of auxiliary equipment. The action is reversed when changing back to listening condition from sending condition since the voltage pulse induced in secondary 20 is in the opposite direction when the switch 13 is again opened.

The apparatus operates automatically and requires neither sensitive nor accurate components. It may be used with devices other than headsets and further may embody two relays instead of the one shown herein.

Obviously many modifications and variations of the present invention are possible in the light of the above teachings. It is therefore to be understood that within the scope of the appended claims the invention may be practiced otherwise than as specifically described.

I claim:

1. Control apparatus comprising a headset, a bypass switch connected for either opening or closing a low impedance path across said headset, a branch circuit additionally connected across said headset, a source of direct current and a pulse producing means serially connected in said branch circuit whereby actuating the bypass switch changes the amount of current flowing through the pulse producing means from said source of direct current for generating a pulse adapted for control purposes.

2. Apparatus for controlling the operation of an auxiliary circuit comprising, a headset, a bypass across said headset controlled by a manually operable on-off switch included therein, a circuit branch additionally connected across said headset, said circuit branch comprising a source of direct current and the primary coil of a non-linear transformer, said non-linear transformer having a secondary coil, a flip-flop circuit controlled by said secondary coil, a relay in series with one of the plates of the flip-flop circuit whereby the current flowing through the transformer primary has one value when the manual switch is open and a higher value when the manual switch is closed so that the transformer produces an output pulse of limited magnitude when the manual switch is actuated.

3. Apparatus for use with a headset comprising, a bypass branch connected directly across the headset, the bypass branch having a manually controlled on-off switch, a second circuit branch connected directly across said headset and having a source of direct current, a non-linear transformer, the primary of said transformer being connected in series with said source of direct current and acting as an effective choke to any alternating current flow therethrough, a flip-flop circuit, said flip-flop circuit having a pair of triodes, the grids of said triodes being connected to opposite ends of said transformer secondary, a control relay in circuit with one of the plates of said triodes whereby the relay is energized when the one of said triodes is conducting and deenergized when the other of said triodes is conducting so that actuating the switch of said bypass branch changes the amount of current flowing through the transformer to cause a voltage to be induced in the transformer secondary for kicking over the flip-flop circuit to its opposite stable operating condition in order to cause the conducting triode to become non-conducting and the non-conducting triode to become conducting.

4. A system for controlling apparatus auxiliary to a transmitter-receiver comprising a headset connected to the output stage of a receiver through a condenser, a bypass switch means connected for either opening or closing or closing a low impedance path across said headset, a circuit branch additionally connected across said headset, a non-linear transformer the primary of which is included in said circuit branch, a source of direct current in series with said primary in said circuit branch, the said source of direct current supplying two levels of current, one when the bypass switch means is open and a higher level of current when the bypass switch means is closed, a flip-flop circuit having two triodes, the grids of said triodes being connected to the ends of the secondary of said non-linear transformer and the cathodes of said triodes are joined to the centertap of the secondary through a grid bias source whereby actuating the bypass switch changes the current through the transformer primary resulting in a voltage pulse induced in the secondary for causing the flip-flop circuit to kick over, and a relay in the plate circuit of one of the triodes arranged to be energized when said one of the triodes is conducting and deenergized when the flip-flop circuit kicks over so that the other of said triodes is conducting.

5. Apparatus adapted for use with sound equipment that includes a headset adapted to be condenser-coupled to the output stage of a receiver, a switch adapted to assume either an open or a closed position, and a microphone adapted to be connected to a transmitter and wherein the bypass switch and the microphone are connected in series and the combination of the series-connected bypass switch and microphone are connected in parallel with the headset, said apparatus comprising: a circuit branch, said circuit branch including a source of direct current and a pulse producing means connected in series with the said source of direct current, said circuit branch adapted to be connected in parallel with the headset whereby the bypass switch of the sound equipment is adapted to change the impedance to current flow originating from said source of direct current and whereby said pulse producing means is adapted to produce an output pulse when the resultant current flow therethrough changes from one level to another.

References Cited in the file of this patent

UNITED STATES PATENTS

| Number | Name | Date |
|---|---|---|
| 2,422,309 | McCreary | June 17, 1947 |